United States Patent [19]

Liu et al.

[11] 4,029,862

[45] June 14, 1977

[54] OLEFIN POLYMER CHLORINATION PRODUCTS HAVING IMPROVED HANDLING PROPERTIES AND PROCESS FOR THEIR PREPARATION

[75] Inventors: Gordon Y. T. Liu, Baton Rouge; Loyd D. Hutchinson, Denham Springs; S. Douglas Stain, Jr., Baton Rouge, all of La.

[73] Assignee: The Dow Chemical Company, Midland, Mich.

[22] Filed: Mar. 15, 1976

[21] Appl. No.: 666,844

Related U.S. Application Data

[63] Continuation-in-part of Ser. No. 590,249, June 25, 1975, abandoned, which is a continuation of Ser. No. 373,531, June 25, 1973, abandoned.

[52] U.S. Cl. .................................... 526/43; 526/22
[51] Int. Cl.$^2$ ................................... C08F 8/22
[58] Field of Search ................................ 526/43

[56]  References Cited

UNITED STATES PATENTS

| | | | |
|---|---|---|---|
| 2,890,213 | 6/1959 | Noeske | 260/94.9 H |
| 3,547,866 | 12/1970 | Trieshmann | 260/94.9 H |
| 3,813,370 | 5/1974 | Gambaretto et al. | 526/43 |
| 3,887,533 | 6/1975 | Mukerjee | 526/54 |

FOREIGN PATENTS OR APPLICATIONS

| | | | |
|---|---|---|---|
| 834,905 | 5/1960 | United Kingdom | 260/94.9 |
| 1,228,922 | 3/1971 | United Kingdom | 260/94.9 |

*Primary Examiner*—William F. Hamrock
*Attorney, Agent, or Firm*—Ronald G. Brookens

[57]  ABSTRACT

Olefin polymer chlorination products having improved handling properties are prepared by reacting, in a fluidized-bed state, certain free-flowing, high bulk density linear olefin polymer powders with gaseous chlorine. The olefin polymer powder used is characterized by having a flowability measured as angle of repose in the range of from about 24° to about 28°, a bulk density in the range of from about 25 to about 35 pounds/cubic foot and a surface area in the range of from about 2 to about 4 square meters/gram. The individual particles of the olefin polymer particle are characterized by having particle sizes predominantly in the range of from about 300 to about 600 microns, and porosity sufficient to provide an average free volume within individual particles in the range of from about 20 to about 45 volume percent based on total particle volume.

2 Claims, 27 Drawing Figures

OLEFIN POLYMER CHLORINATION PRODUCTS HAVING IMPROVED HANDLING PROPERTIES AND PROCESS FOR THEIR PREPARATION

CROSS REFERENCE TO RELATED APPLICATIONS

This is a continuation-in-part of application Ser. No. 590,249, filed June 25, 1975 (now abandoned) which, in turn, is a continuation of application Ser. No. 373,531, filed June 25, 1973 (now abandoned).

BACKGROUND OF THE INVENTION

It has been proposed in U.S. Pat. No. 2,890,213, Canadian Pat. No. 696,260, and British Pat. Nos. 799,952 and 834,905 to chlorinate solid, finely divided polyethylene, i.e., polyethylene powder wherein the individual particles have a size below 300 microns and predominantly below 80 microns, directly in the vapor phase and without the use of solvent by suspending such powder in a stream of chlorine at temperatures below 100° C. wherein chlorine, in amounts of from about 30 to 65 percent of polymer weight, is substantially heterogeneously distributed along the outer surfaces of the polyethylene particles. The use of such finely divided particles, i.e., high surface area powders, is disclosed as being necessary to achieve adequate rates and amounts of chlorination. Disadvantageously, such finely divided polymer particles produce excessive dust with accompanying atmospheric pollution and explosive hazards.

U.S. Pat. No. 3,547,866, recognizing the tendency of small particle size (high surface area) polyethylene to dust and agglomerate, discloses the utilization of polyethylene starting materials of larger particle size, i.e., particles of from 200 to 800 microns in size but which are further characterized by having a relatively low surface area, i.e., a surface area of from 70 to 300 cm$^2$/gram.

Further, British Pat. No. 1,228,922 uses polyethylene materials of relatively large particle size, i.e., from 400 to 5,000 microns, but like U.S. Pat. No. 3,547,866 utilizes polymer powders having a relatively low surface area, i.e., a surface area of from 20 to 100 cm$^2$/gm, which limits the desired rate and extent of chlorination utilizing a fluidized-bed chlorination technique.

In view of the foregoing, it would be highly desirable to provide a means for the fluid-bed chlorination of olefin polymer powder wherein the polymer powder particles are of sufficient size to prevent dusting with accompanying elimination of atmospheric pollution and explosion hazard, and wherein such polymer powder particles have a surface area of sufficient size to permit an enhanced rate of chlorination.

It is further desirable to provide chlorinated products which do not agglomerate during or after the chlorination reaction.

SUMMARY OF THE INVENTION

The advantageous results referred to supra are achieved by chlorinating certain solid, linear, high bulk density olefin polymer powders with gaseous chlorine while holding such polymer powder in a fluidized-bed state. More particularly, the olefin polymer powder used is characterized by having a flowability measured as angle of repose in the range of from about 24° to about 28°, a bulk density in the range of from about 25 to about 35 pounds/cubic foot, and a surface area in the range of from about 2 to about 4 square meters/gram. It is a further requirement of the present invention that the individual particles of such olefin polymer powder have particle sizes predominately in the range from about 300 to about 600 microns and have a porosity sufficient to provide an average free volume within individual particles in the range of from about 20 to about 45 volume percent based on total particle volume.

The chlorination process of the present invention is unique in that the olefin polymer powders contemplated for use therein exhibit substantially no dusting and explosive hazards and exhibit an unexpectedly high rate and extent of chlorination. The latter finding is particularly unexpected as much of the surface area of such polymer powder is present as internal porosity which is shielded from any catalyzing effect of active radiation. Further, the olefin polymer chlorination products obtained are unique in that they are substantially free from undesirable agglomeration during or following the chlorination reaction.

DESCRIPTION OF THE PREFERRED EMBODIMENTS

The term "olefin polymer" means polymers of olefins in which the backbone chain of the polymer marcomolecule is substantially noncross-linked and nonbranched and includes polymers of the ethylene, propylene, butene-1 and higher 1-alkenes having 5 to 10 carbon atoms in which polymer the linear main chain has substituent ethylene monomer. As used herein, the term "olefin polymers" is also meant to include homopolymers, copolymers and interpolymers of 1-alkenes and mixtures and blends thereof. The molecular weights of olefin polymers used in the practice of this invention are comparable to those of olefin polymers produced in coventional Ziegler-Natta polymerization processes, e.g., from about 30,000 up to about 3 million or more.

For purposes of this invention, the term "polyethylene" is used to denote preferred olefin polymers and means homopolymers of ethylene and copolymers of ethylene and up to about 5 weight percent of aliphatic, hydrocarbon $\alpha$-monoolefin such as propylene-1 and butene-1. Such polyethylenes have absolute densities in the range from about 0.90 to about 0.97 g/cc, especially from about 0.950 to about 0.967 g/cc, and melt indexes as determined by ASTM D-1238 -65T(E) in the range from about 0.01 to about 40 decigrams/minute, especially from about 0.1 to about 10 decigrams/minute.

The polyolefins employed in the practice of this invention are in the form of normally extrudable, free flowing powder having a bulk density in the range from about 25 to about 35 pounds/cubic foot. The particles of such powder are free flowing, porous particles having individual sizes within the range from about 300 to about 800 microns, preferably from about 300 to about 600 microns and having generally roughened surfaces resulting from their agglomerate-like structure. Uniquely, the particles of this powder have substantial open or free space within the particles themselves. On the average, as much as about 50 volume percent and as little as about 20 volume percent based on total particle volume is free or open space occurring as pockets within the particles and as pores or openings on the particle surfaces. Preferred polyethylene powders have flowability measured as angle of repose in the range from about 24° to about 28° and an open space (or free volume) within individual particles in the range of from about 25 to about 45 volume percent based on total particle volume. Screen analysis of especially preferred polyethylene powders indicates a particle size distribution in weight percent of total powder at the designated particle size as follows:

1.6–14.3% greater than 540 microns
72.3–37.6% from about 320 to about 540 microns
4.7–20.1% from about 248 to about 320 microns
0.8–3.3% from about 175 to about 248 microns
0.1–0.6% from about 147 to about 175 microns
0.2–1.2% less than about 147 microns.

Especially preferred powders also have surface areas in the range from about 2 to 4 square meters/gram.

The olefin powder powders used in the present invention are preferably made by a low pressure polymerization process carried out in the presence of a special titanium-containing catalyst at slurry polymerization temperatures. More specifically, these high bulk density powders are preferably provided by polymerizing ethylene under low pressures, e.g., from about 5 to about 30 atmospheres, and slurry polymerization temperatures, e.g., from about 0° to about 100° C., in the presence of trialkyl aluminum and a titanium containing component which has been prepared from titanium tetrachloride and diethyl aluminum monochloride. In preparation of the special titanium-containing catalyst, titanium tetrachloride dissolved in an inert hydrocarbon solvent is reacted using thorough stirring with diethyl aluminum monochloride also dissolved in inert hydrocarbon solvent in a manner such that the molar ratio of titanium tetrachloride to diethyl aluminum monochloride is at any time prior to reaction of all titanium tetrachloride at least 1; the reaction product is then washed with inert hydrocarbon solvent and filtered to remove hydrocarbon-solvent-soluble impurities; and the washed reaction product is activated by adding trialkyl aluminum in amount such that the molar ratio of trialkyl aluminum and titanium-containing reaction product is from about 0.3:1 to about 3:1 in the resulting catalyst. U.S. Pat. No. 3,907,760 is particularly pertinent to such polymerization technique.

It is understood, however, that other processes capable of producing high bulk density olefin polymer powders having the aforementioned properties are also suitably employed in the practice of this invention.

For purposes of the present invention, the chlorination of such olefin polymer powders may be effected in various ways. It is possible, for example, to agitate the granular polymer by means of stirring devices while exposing it to the action of a current of chlorine, in the substantial absence of oxygen, wherein the chlorine has preferably been preheated.

Various apparatus which are equipped with efficient agitating means may be employed to accomplish this, including reactors having paddle agitators and the like and rotating cylinders which may be provided with internal mixing baffles and the like and which may be vertically or horizontally disposed, or may be inclined from the horizontal to facilitate a continuous internal passage of solid material therethrough during operation. Or, if desired, the material may be thoroughly exposed to the halogen atmosphere and effectively agitated by conducting the reaction according to well known fluid be techniques. When this is practiced, the current of halogen atmosphere is passed through a finely divided and free-flowing or fluidized-bed or layer of the material to be halogenated. The passage or forcing of the halogen atmosphere through the fluid bed is done at a sufficient rate to accomplish a thorough agitation and exposure of the material being halogenated. Any apparatus in which the free-flowing mass of polymer may be thoroughly subjected to the halogen atmosphere at the desired temperature may be suitably employed for conducting the reaction according to the present invention. Further, fluorine and vaporized bromine, or mixtures of these may advantageously be used in conjunction with gaseous chlorine to constitute the halogen atmosphere of the present invention. In certain instances it may be desirable for the halogen atmosphere to contain inert gases and vapors as diluents or carriers. This may permit a better control over the reaction. In some instances it may also be advantageous to have only portions of the halogen atmosphere diluted when a continuous process is being employed or to have it diluted only during particular intervals in a batch reaction. In this manner it is possible in the course of a particular halogenation to adjust reaction conditions to suit the changing reactivity at various halogen contents of the olefin polymer powder being halogenated.

Any compatible gas or vapor which, under the reaction conditions, is inert to both the halogen atmosphere and the olefin polymer powder being halogenated may be used as a halogen carrier to dilute the halogen atmosphere. Helium and the inert gases, nitrogen, carbon dioxide, hydrogen halides, perchloro, perfluoro, or fluoro-chloro hydrocarbons and steam and water vapor may be included among the suitable diluents which may be employed. Recycling of the hydrogen halide formed during the reaction will also frequently furnish a suitable means for diluting the halogen atmosphere. It may sometimes be desirable to externally cool the hydrogen halide formed during the reaction when it is being recycled as a diluent. This may furnish an effective means for controlling the temperature of the reaction within a desired range. The employment of water vapor to dilute the halogen atmosphere may also be an effective means for providing closer control of the reaction temperature.

In connection with this, neither the polymer nor the halogen atmosphere need be done dry, or dry in the physio-chemical sense. The presence of very small amounts of water or other inert liquids in the polymer may be beneficial in several respects. As times their presence may be useful to regulate the temperature by absorbing excessive heat through vaporization. In addition, small amounts of liquid in the polymer may also be useful to accelerate the reaction by facilitating the absorption of halogen into the polymer. The amount of liquid contained in the polymer should not constitute a sufficient quantity, of course, to interfere with the free-flowing powder chracteristics of the polymer.

The temperature below the sintering temperature of the olefin polymer powder being halogenated which is most suitable for the reaction will vary in individual cases with a variety for factors and conditions. Primarily it will be governed by the mutual reactivity of the particular olefin polymer powder and halogen atmosphere which are being employed and the extent of halogenation which is desired to be effected. The reactivity of the halogen atmosphere depends directly on the particular halogen or halogens which it contains and, further, on their effective concentration in the halogen atmosphere. The reactivity of the polymer being halogenated is initially fixed by the character of the parent material but may change in the course of a given reaction with a changing halogen content in such polymer. The particle size or shape of the polymer being halogenated may also influence the reaction since particles having greater surface areas, particularly smaller sized particles or those with crenulated or otherwise irregular configurations, tend to be more conducive to the reaction. The rate of reaction at any given temperature is also dependent to a considerable extent on the rate of diffusion of the halogen from the halogen atmosphere into the polymer being halogenated and the capacity of the polymer at such temperature to absorb the particular halogen which is involved.

The optimum temperature for conducting the reaction is usually the highest temperature which can safely be employed to obtain a desired rate of reaction without casing the polymer being halogenated to sinter, fuse or char. The upper permissible temperature limit for any reaction being conducted in a controlled manner is frequently also a function of the cohesive characteristics of the particular polymer being employed and of the halogenated products being obtained during the reaction. The extent of the temperature range beneath the sintering temperature of the polymer which is being utilized is generally predominantly governed by its mutual reactivity with the halogen atmosphere. Usually it falls within a range which is between about 5 and 100 centigrade degrees beneath the sintering temperature of the particular polyolefin which is involved.

Thus, chlorinations according to the present invention can usually be accomplished in a range between about room temperature and about five centigrade degrees beneath the sintering temperature in air of the polymer being chlorinated. In this connection, a reaction temperature of from about room temperature to about 100° C. is suitable for directly chlorinating the olefin polymer powders prescribed herein, especially when such polymers have relatively high molecular weight and a melting point in the neighborhood of about 125°–135° C. To obtain chlorinated polyethylenes of relatively low chlorine content, i.e., chlorine contents of up to about 30 percent by weight, it is preferable to conduct the reaction at a temperature not exceeding about 90° C and preferably not exceeding about 80° C. In order, however, to obtain higher chlorinated polyethylenes, especially products in which the desired chlorine content is greater than about 30 percent by weight, it is preferable to conduct the reaction comprising one or more stages utilizing an optimum operating range which falls between about 20° C. and about 100° C.

Although the rate of halogenation increases with temperature, care should be taken to avoid higher temperatures which may sinter, fuse or char the polymer. When this occurs it becomes more difficult to keep the finely divided polymer in a proper state of agitation and it may cause non-uniformity in the product. In addition, the halogenation reaction is seriously impeded with a sintered polymer because of agglomeration or sticking together of the sintered particles and the relatively great reduction in exposed surface area which is thereby occasioned.

The optium temperature of reaction may vary in the course of a particular halogenation due to changes in the softening point of the polyolefin being halogenated at various combined halogen contents. The softening points of many chlorinated polyolefinic materials, for example, tend to first decrease slightly as compared to the parent polyolefin and then to increase as greater amounts of chlorine are combined in the polymer. In such cases it is usually advantageous, as mentioned, to alter the temperature of reaction throughout the halogenation so that an optimum temperature is constantly maintained at some desired point beneath the changing sintering temperature of the polymer being halogenated.

The initial portions of the halogenation reactions according to the present invention are usually strongly exothermic and may frequently be advantageously performed at the lower extremities of the indicated suitable temperature ranges for the various halogen atmospheres which may be employed. After the occurrence of the strongly exothermic initial portion of the reaction, however, further halogenation at such lower temperatures may proceed at an undesirably low rate. For example, when solid polyethylene is being directly chlorinated at about room temperature, the rate of the reaction diminishes markedly to an undesirably low level after about ten percent of the available hydrogen in the parent polymer has been replaced. Advantage may frequently be taken of this phenomenon when lower halogenated products are desired to be prepared or in order to effect a better control over the earlier and more vigorous stages of a halogenation in which higher halogen containing products are being sought. A reaction may thus be initiated with an unhalogenated polymer at as low a temperature as will provide a satisfactory halogenation rate. After the halogenation has proceeded to the point at which the exothermic nature of the reaction is not sufficiently pronounced to maintain a desired rate, increasing temperatures may be employed in correlation with the subsiding exothermic nature of the reaction to maintain the rate of the reaction at the desired level until a product containing the desired amount of combined halogen is obtained.

The direct halogenation reaction of the present invention may be conducted under any desired pressure. Advantageously, it may be carried out at atmospheric pressure although, if desired, superatmospheric pressures may also be employed to hasten the reaction. Better results may often be obtained when the reaction is being conducted under atmospheric pressure by employing a halogen atmosphere which contains amounts of the halogen in excess of stoichiometric requirements. When the reaction is conducted under superatmospheric pressure, care should be exercised to adequately vent the by-product materials which are formed in order to maintain an efficient halogen level in the halogen atmosphere.

The following example illustrates the invention but should not be considered as limiting its scope. All parts and percentages are by weight unless otherwise indicated.

EXAMPLE

A. Preparation of High Bulk Density Polyethylene Powder

In each of several experiments, polyethylene powder having high bulk densities (as specifically set forth in the following tables) were obtained by polymerizing ethylene under low pressures, e.g., from about 5 to about 30 atmospheres, and slurry polymerization temperatures, e.g., from about 0° to about 100° C. in the presence of trialkyl aluminum and a titanium containing component which had been prepared from titanium tetrachloride and diethyl aluminum monochloride. In preparation of the special titanium-containing catalyst, titanium tetrachloride dissolved in an inert hydrocarbon solvent was reacted using thorough stirring with diethyl aluminum monochloride also dissolved in inert hydrocarbon solvent in a manner such that the molar ratio of titanium tetrachloride to diethyl aluminum monochloride was at any time prior to reaction of all titanium tetrachloride at least 1; the reaction product was then washed with inert hydrocarbon solvent and filtered to remove hydrocarbon-solvent-soluble impurities; and the washed reaction product activated by adding trialkyl aluminum in amount such that the molar ratio of trialkyl aluminum and titanium-containing reaction product is from about 0.3:1 to about 3:1 in the resulting catalyst. Each polymerization mixture was agitated at a rate of about 140 RPM. In each instance polymer product in the form of a slurry was withdrawn from the reactor and the polymer particles thereof recovered (by steam distillation and drying in an air slick). Examination of the polymer particles with an electron scanning micrograph confirms all of such particles as being generally porous, partially fused agglomerates of much smaller particles, the agglomerates having rough surfaces. Screen analysis of the polymer particles indicates a particle size distribution in weight percent of total powder at the designated particle size as follows:

1.6–14.3% greater than 540 microns
72.3–87.6% from about 320 to about 540 microns
4.7–20.1% from about 248 to about 320 microns
0.8–3.3% from about 175 to about 248 microns
0.1–0.6% from about 147 to about 175 microns
0.2–1.2% less than about 147 microns The high bulk density polyethylene polymers prepared as described herein were further characterized by having a flowability measured as angle of repose of from about 24° to about 28°, a bulk density in the range of from about 25 to about 35 pounds/cubic foot and a surface area in the range of from about 2 to about 4 square meters/gram. Further, the individual particles of the polymer were characterized by having a porosity sufficient to provide an average free volume within individual particles in the range of from about 20 to about 45 volume percent based on total particle volume.

B. Preparation of Low Chlorinated High Bulk Density Polyethylene Powder

Individual portions of the high bulk density polyethylene powders of (A) supra were separately chlorinated (to various degrees) by fluidizing such material in a suitable container by passing an inert gas (nitrogen or other gas) through the material in the substantial absence of oxygen, then adding chlorine to the fluidizing gas. In each instance, the reaction was conducted at a temperature not exceeding about 80° C. for a time sufficient to provide at least 1 to about 30 percent by weight of chemically combined chlorine on the polymer particles. Examination of electron photomicrographs of each of the resulting polymeric materials established that the chlorine was heterogeneously attached substantially to the outer surfaces of the polyethylene polymer particles. In the following tables the designated polymer properties are defined as follows:

Melt Index — $I_2$ and $I_{10}$ — Melt index in decigrams/minutes as determined by ASTM Test No. D-1238-64T(E) and D-1238-84T.

Flexural Modulus (PSI) — ASTM Test No. D-790-63.

Tensile Impact (ft./lbs/in.$^2$) — ASTM Test No. D-1822-61T.

Izod Impact (ft./lbs/in. notch) — ASTM Test No. D-256-56.

Yield Strength (PSI) — ASTM Test No. D-1248-63T.

Crystallinity — % relative crystallinity.

ESCR $F_{50}$ — Environmental Stress Crack (Hours at which 50% of samples tested fails) - ASTM Test No. D-746-57T Viscosity, $935^{-1}$ (poise) — LPO-C-34

Bulk Density (lbs./cu. ft.) — LPO-D-2.

Surface Area (m$^2$/gm) — Determined by use of a Strohlein Area Meter which is a conventional one point surface area apparatus calculated in M$^2$/gram wherein the surface area value is calculated as one point of an isotherm.

TABLE I

Fluid Bed Chlorinated 0.29 and 0.32 Melt Index High Bulk Density Polyethylene

| Melt Index | None | Series A Percent Chlorine | | | | | Series B Percent Chlorine | |
|---|---|---|---|---|---|---|---|---|
| | | 1.3 | 1.8 | 3.8 | 5.5 | 6.9 | 17.6 | None |
| $I_2$ | 0.29 | 0.27 | 0.27 | 0.14 | 0.11 | 0.04 | 0.02 | 0.32 |
| $I_{10}$ | 3.02 | 2.95 | 2.95 | 2.25 | 2.17 | 1.20 | 0.37 | 4.29 |
| $I_{10}/I_2$ | 10.4 | 10.8 | 10.8 | 16.8 | 19.7 | 30.0 | 18.5 | 13.4 |
| Modulus (PSI × 10$^3$) | 190 | 166 | 151 | 103 | 87 | 94 | 50 | 173 |
| Tensile Impact (PSI) | 67.4 | 120 | 82.3 | 91.0 | 96.8 | 121 | 56 | 75 |
| Izod Impact (PSI) | 9.3 | 9.5 | 8.0 | 13.3 | 14.5 | 16.1 | 17 | 10.8 |
| Yield Strength (PSI) | 4315 | 3800 | 3540 | 3020 | 2785 | 2490 | 2200 | 4175 |
| % Crystallinity | 81.7 | 67.8 | 76.6 | 73.1 | 63.2 | 63.4 | — | — |
| ESCR $F_{50}$ | 25 | 48 | 124 | — | — | 248 | — | 42 |
| Viscosity ($935^{-1}$) | 4464 | 4826 | 4712 | 4836 | 4960 | 5084 | 5487 | 5456 |
| Bulk Density | 30.6 | 26.9 | 27.2 | 27.6 | 28.5 | 28.4 | 28–29 | 34.3 |
| Surface Area of Polymer Particles (m$^2$/gm) | 2–4 | 2–4 | 2–4 | 2–4 | 2–4 | 2–4 | 2–4 | 2–4 |

TABLE II

Fluid Bed Chlorinated 1.43 Melt Index High Bulk Density Polyethylene

| Melt Index | Percent Chlorine | | | | |
|---|---|---|---|---|---|
| | None | 1.3 | 4.3 | 6.5 | 7.9 |
| $I_2$ | 1.43 | 1.37 | 0.93 | 0.63 | 0.38 |
| $I_{10}$ | 14.7 | 15.0 | 12.4 | 10.3 | 7.92 |
| $I_{10}/I_2$ | 10.2 | 10.9 | 13.3 | 16.3 | 20.8 |
| Modulus (PSI × $10^3$) | 198 | 176 | 121 | 110 | 79 |
| Tensile Impact (PSI) | 23.8 | 30.3 | 45.0 | 41.2 | 54.8 |
| Izod Impact (PSI) | 1.7 | 1.5 | 2.4 | 5.0 | 8.6 |
| Yield Strength (PSI) | 4550 | 4295 | 3330 | 2830 | 2500 |
| % Crystallinity | — | — | — | — | — |
| ESCR $F_{50}$ | 12 | 16 | 64 | — | — |
| Viscosity ($935^{-1}$) | 4030 | 4029 | 4092 | 4184 | 4340 |
| Bulk Density | 25.5 | 23.3 | 23.5 | 24.8 | 26.0 |
| Surface Area of Polymer Particles ($m^2$/gm) | 2–4 | 2–4 | 2–4 | 2–4 | 2–4 |

BRIEF DESCRIPTION OF THE DRAWINGS

FIGS. 1 through 6 further graphically represent the properties of chlorinated polyolefins prepared as described herein. It is pointed out that the high bulk density polyethylene feedstock can consist of molecular weights from injection molding resins to ultra high forging resins. Using this wide range of feedstocks the addition of chlorine has a pronounced effect on processability, environmental stress crack resistance, impact and flexural modulus.

Environmental stress crack resistance as measured by the Bell bent strip test increases dramatically with increasing chlorine content as illustrated by FIG. 3. The overall ESCR of a given chlorinated polyethylene is determined by the ESCR of the feedstock. Both tensile and izod impact are improved with increasing chlorine level as shown in FIGS. 4 and 5. Starting with a high density polyethylene feedstock increasing chlorine content decreases flexural modulus into the intermediate to low density polyethylene range as shown in FIG. 6.

The chlorinated polyethylenes hereinbefore identified as Series A of Table I were converted into 2-mil thick film on a "Poly A," 1-inch, MPM film rig. Samples of each of the films produced were tested for tensile yield, ultimate tensile, percent elongation and Elmendorf tear strength both across the machine direction (AMD) and with the machine direction (WMD). The following Table III identifies the materials used and the film properties observed.

TABLE III

| % Chlorine | Tensile Yield (PSI) | | Ultimate Tensile (PSI) | | Elongation % | | Elmendorf Tear Strength (PSI) | |
|---|---|---|---|---|---|---|---|---|
| | AMD | WMD | AMD | WMD | AMD | WMD | AMD | WMD |
| None | 4600 | 4590 | 9940 | 6510 | 600 | 650 | 218 | 229 |
| 1.3 | 4400 | 4510 | 9000 | 8000 | 650 | 700 | 272 | 266 |
| 1.8 | 4290 | 4350 | 7550 | 6900 | 575 | 600 | 293 | 213 |
| 3.8 | 3810 | 4020 | 6930 | 5980 | 550 | 550 | 341 | 282 |
| 5.5 | 3885 | 3870 | 8270 | 6170 | 550 | 550 | 496 | 240 |
| 6.9 | 4170 | 3500 | 7830 | 6850 | 500 | 650 | 501 | 352 |

The above data illustrate that the low chlorinated olefin polymer powders as prescribed herein provide highly beneficial properties when employed as flexible film.

The relatively low chlorinated polyethylene products as described herein are also particularly useful for the preparation of flexible bags having excellent impact strength, as shatterproof glass bottle coatings, as electrical insulation, as paint adhesion promoting materials and as stress crack resistant coatings for use in high pressure piping and the like.

C. Preparation of Highly Chlorinated High Bulk Density Polyethylene (HCHBDP)

In each of a series of experiments, a polyethylene powder, prepared as set forth in (A) supra and having the properties as described in the following Table IV, was chlorinated (to various amounts) by fluidizing such material in a mixture of gaseous chlorine and nitrogen contained in a 36 inch long pyrex glass reactor havin a cross-sectional diameter of 4 inches. The free radical chlorination was initiated by ultraviolet light. Anhydrous HCl and excess $Cl_2$ was continuously removed.

In each instance the chlorination reaction was conducted in two stages with the first stage (initial reaction) being controlled using the average reactor temperature as a set point for regulating $Cl_2$ flow. The second stage (post reaction) was carried out by heating the feed gas at a constant $Cl_2$ flow.

These experiments indicate that the high bulk density polyethylene powder, as prescribed for use by the present invention, could be chlorinated at a temperature of from about 60° C. to 80° C. to a chlorine content up to about 65 percent by weight with no evidence of undesirable powder dusting or agglomeration. By way of comparison, chlorination in the same manner of the low density polyethylene powders described in Table IV resulted in severe dusting in the reactor and significant agglomeration of the chlorinated particles.

TABLE IV

| Property | High Bulk Polyethylene | Low Bulk Polyethylene |
|---|---|---|
| Bulk Density (lb/ft$^3$) | 29–35 | 16–22 |
| Melt Index | 1.1 and 0.5 | 1.0 and 0.5 |
| $I_{10}/I_2$ | 11–13 | 11–13 |
| PARTICLE SIZE | | |
| % Above 20 Mesh | 0.1 | 0 |
| % 20–28 Mesh | 17.3 | 0 |
| % 28–42 " | 69.4 | 1.7 |
| % 42–60 " | 10.3 | 2.3 |
| % 60–80 " | 1.9 | 13.2 |
| % 80–100 " | 0.6 | 53.1 |
| % Below 100 Mesh | 0.4 | 29.7 |

An additional series of reactions provided the following information with regard to reaction variables:

PARTICLE AGGLOMERATION VERSUS REACTOR TEMPERATURE

Figure 1:
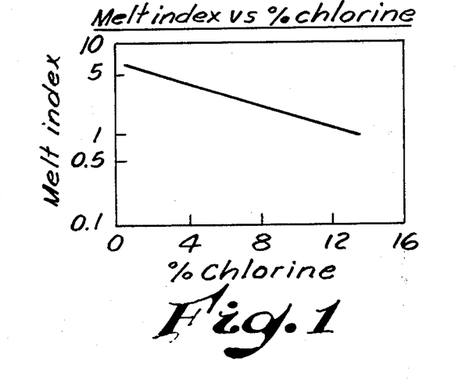
FIG. 1 shows the effect of chlorine on melt index for several different feedstocks with a logarithmic decrease in melt index for increasing chlorine level. However, for equal melt index resins the chlorine modified polyethylene exhibits improved processability as can be seen in FIG. 2.
Figure 2:
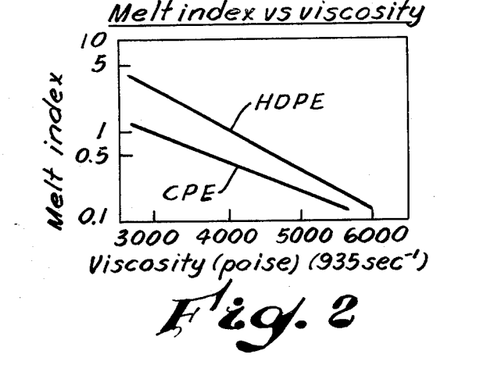
Figure 3:
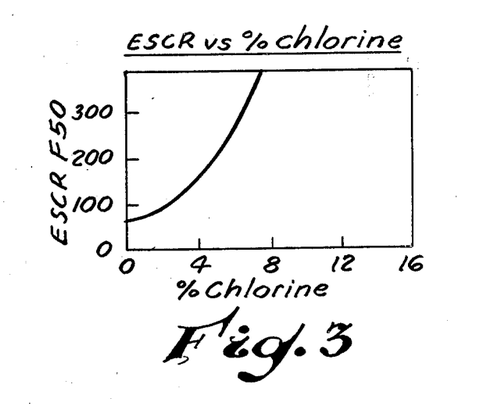
Figure 4:
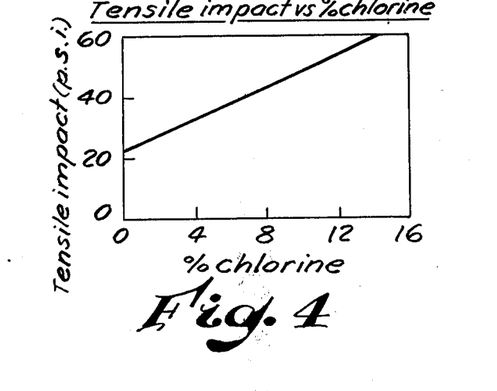
Figure 5:
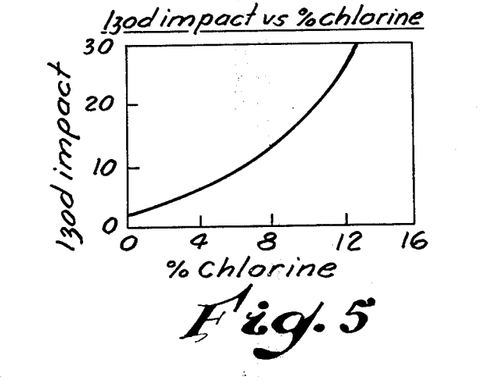
Figure 6:
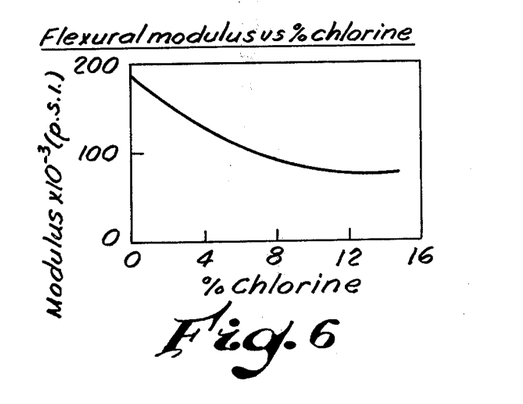
Figure 7:
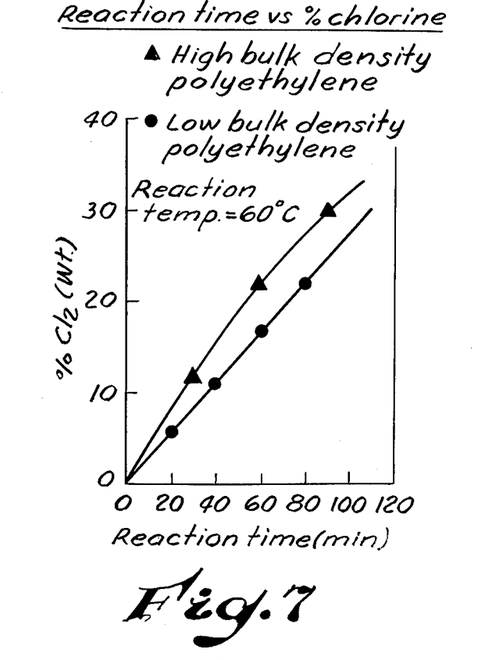
FIG. 7 illustrates a significant and unexpected enhanced rate of chlorination achieved by utilization of the specified high bulk density polyethylene versus use of a conventional solid, linear polyethylene having a bulk density of about 22 and a surface area of less than about 0.9 square meters/gram.
Figure 8:
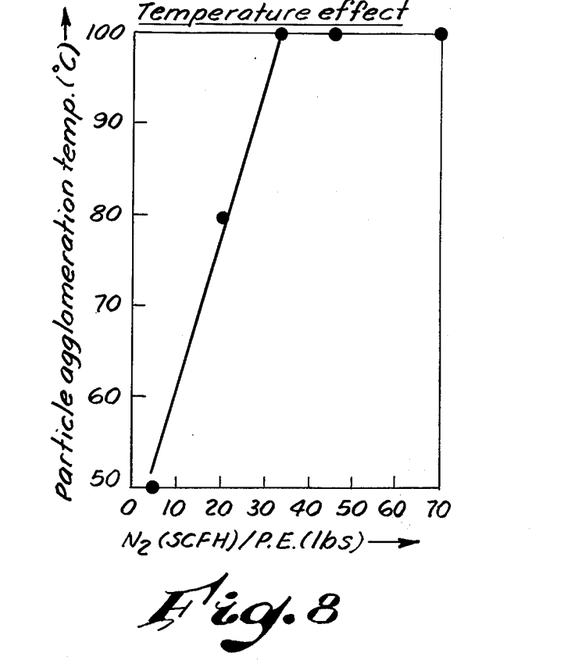

It was discovered that increasing the extent of "fluidization," e.g., measured either as the ratio of SCFH (standard cubic feet/hour) fluidizing gas/lbs. of P.E. (polyethylene) or as fluidizing gas residence time bed height in ft./gas velocity in ft./sec., permitted utilization of reaction temperatures up to 100° C. without evidence of powder agglomeration of the prescribed highly chlorinated high bulk density polyethylene. FIG. No. 8 illustrates this result. It has further been discovered that agglomeration (or blocking) may be prevented by correlating the velocity of the fluidizing gas (e.g., ft./sec. of nitrogen) with the height of the polymer powder in the reactor tube or vessel. More particularly, dividing the height of the polymer powder in the reactor tube by the velocity of the fluidizing gas provides a number representing the residence time of the fluidizing gas within the polymer. If such number is 4 or lower and the temperature of the bed of polymer powder is 100° C. or lower, no blocking will occur. If, however, such number is 5 or higher, the polymer bed will block, even at temperatures as low as about 70° C. If the bed temperature exceeds about 100° C., the polymer bed will block even if the residence time of the fluidizing gas has a value as low as 1.8.

THERMAL PROPERTIES OF CHLORINATED HIGH BULK DENSITY POLYETHYLENE

Figure 9:
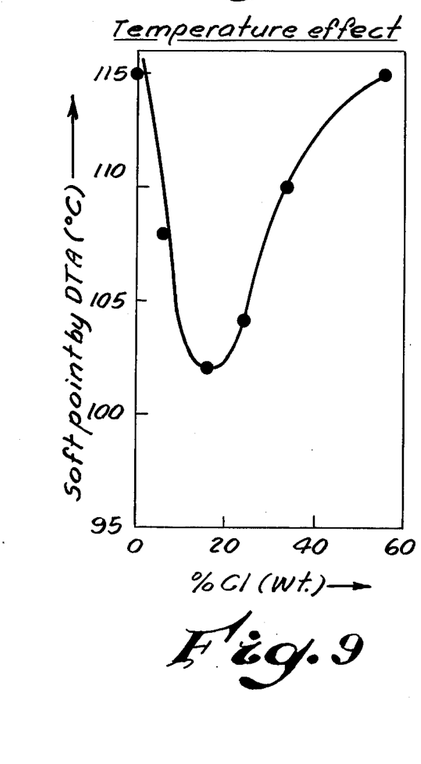

Differential thermal analysis has indicated that the softening temperature of the polymer particles (measured at the point of baseline deviation) passes through a minimum of about 102° C. at a chloride concentration of 16% (FIG. 9).

Increased fluidization cannot increase the maximum temperature because at this point heat transfer is not the issue — the reactor temperature is hotter than the agglomeration temperature of the particles at 16% Cl. This curve also explains why reactors can be operated without agglomeration at temperatures above 100° C. until 15–20% Cl.

This curve is supported by properties of the highly chlorinated high bulk density polyethylene such as heat deflection temperature, flex modulus, etc. which also pass through minimums at 15–20% Cl.

REACTOR TEMPERATURE

Figure 10:
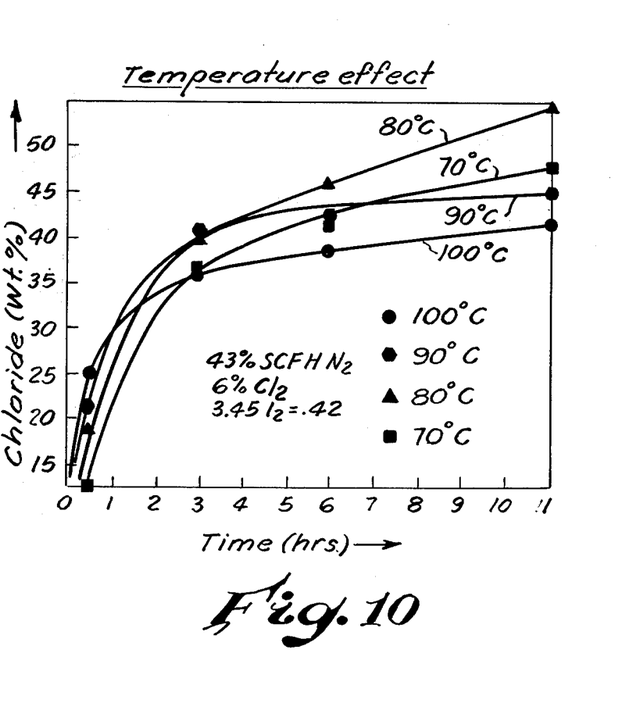

With increased heat transfer of higher fluidization, higher reaction temperatures are possible with proportional increases in reaction rate. FIG. 10 shows chlorination with time of various reactor temperatures. It can be seen that temperatures of 90° and 100° C. produced increases in rate initially but overall rates fell to below those of lower temperature runs.

It has been found that at 80° C. there is no obvious pore fusion of the polymer particle, but fusion becomes progressively worse from 90° to 100° C. As a result of this pore fusion, the interior of the particle becomes less accessible, causing a decrease in reaction rate. The fact that the particles fuse but do not agglomerate indicates heat transfer sufficient to cool the particle before it sticks to another, but not sufficient to prevent individual particle overheating.

In order to operate reactors at temperatures corresponding to the softening curve, it is necessary to have almost perfect heat transfer. This requires fluidization with the particles completely and continually suspended in the fluidizing medium.

COOLED FEED GAS

Cooling the feed gas during the initial section of the chlorination increases reaction rate. This has the same effect as increasing the flow of the feed gas, i.e., to increase the rate of heat transfer. For example, it has been discovered that decreasing feed gas temperature from ambient to −10° C. increased the initial reaction rate about 60%.

HEATED FEED GAS

Figure 11:
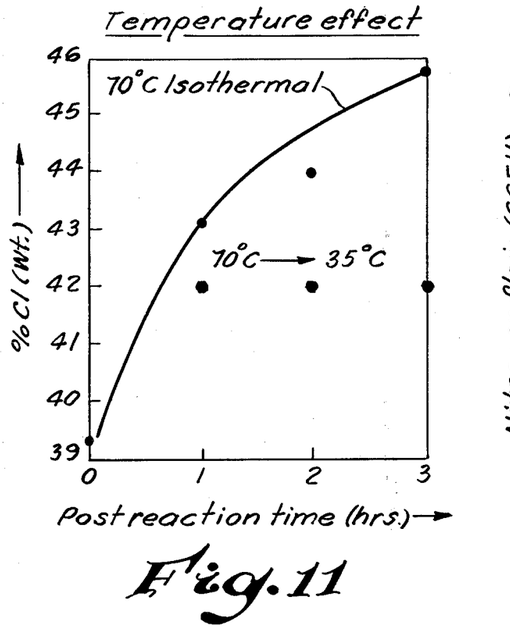

As previously mentioned at a chloride concentration of about 30%, the reaction rate has descreased to the point where heat of reaction is no longer sufficient to maintain reactor temperature. It is then necessary to supply heat in this case by heating the $N_2$ feed. FIG. 11 shows the necessity of maintaining reactor temperature. At about 39% Cl, reaction had decreased to a rate at which the temperature of the reactor began to decrease. Without supplying heated $N_2$, in one hour the reactor temperature had dropped to 35° C. and reaction rate to practically zero.

NITROGEN FLOW

Figure 12:
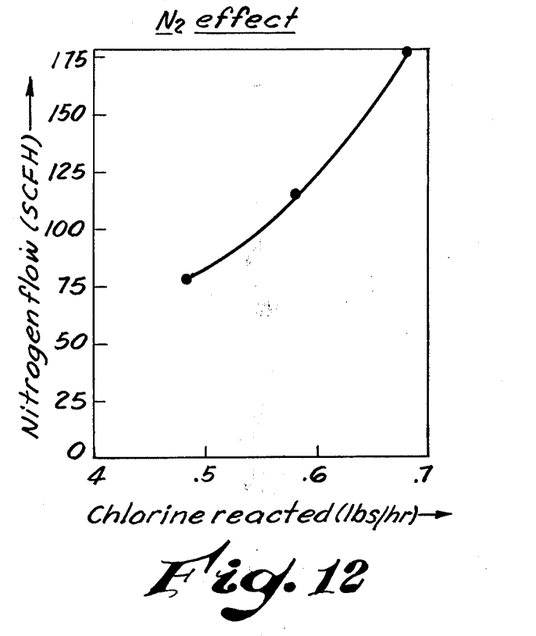

FIG. 12 shows the increased rate observed in the initial reaction with increasing $N_2$ flow. This is because at isothermal conditions, increasing the rate of heat transfer increases the amount of $Cl_2$ that can be reacted.

BASE POWDER $I_2$

Figure 13:
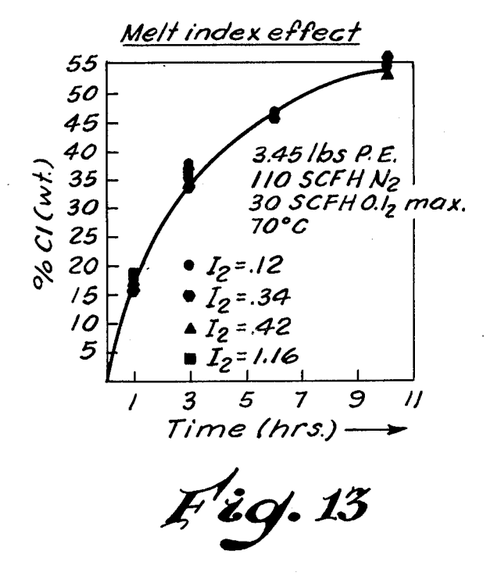
Figure 14:
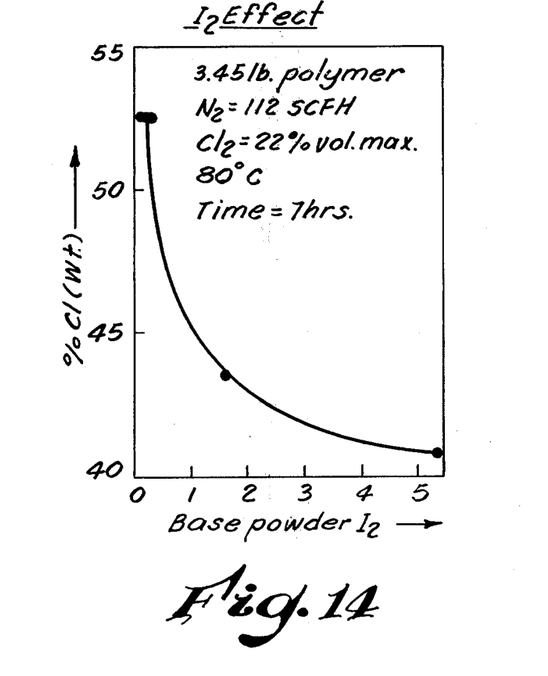

FIG. 13 shows the effect on reaction rate of increased $I_2$ (decreased molecular weight) polyethylene. At 70° C. no significant difference is observed. However, when reactor temperatures are increased to 80° C. a decrease in reaction rate is observed when $I_2$ is increased over the standard material of $I_2$ - 0.5 (FIG. 14).

The higher $I_2$ powder has a lower molecular weight average and a higher concentration of lower molecular weight fractions "wax". For this reason the softening temperature is lowered to below that of lower $I_2$ powder and it cannot be run as hot without pore fusion.

CHLORINE CONCENTRATION

Increasing the concentration of chlorine increases the rate of reaction. In the initial reaction this effect is seen by remembering the effect of increased reactor temperature in FIG. 10. This temperature increased as more $Cl_2$ was allowed to react at constant $N_2$ flow. So in effect the reactor temperature was a set point for the $Cl_2$ concentration.

Figure 15:
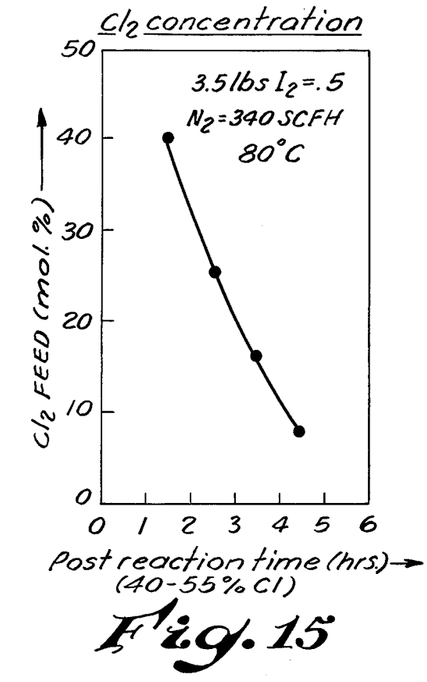

The same effect on reaction rate is observed when $Cl_2$ concentration is increased in the post section of the chlorination (FIG. 15).

It should be remembered that the reaction involves the chlorine-free radical as the chain initiator. Therefore the concentration of ultraviolet light will also be a variable.

ULTRAVIOLET LIGHT

Figure 16:
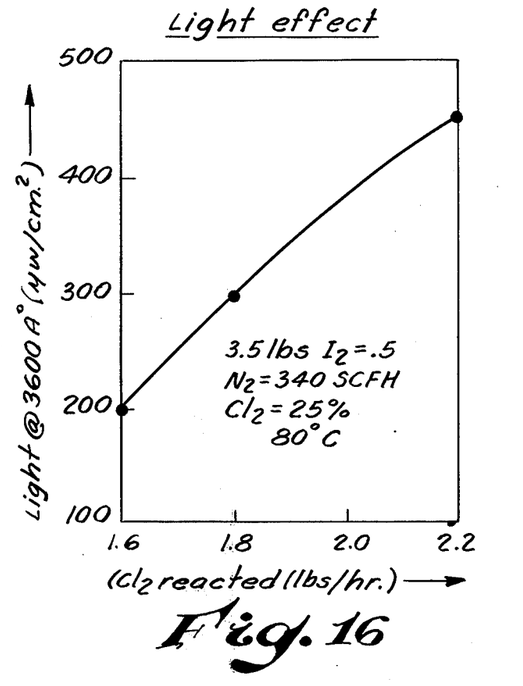

FIG. 16 shows the increased reaction rate observed when ultraviolet light density is increased. By increasing light density, the rate of chlorine-free radical generation is increased.

$$Cl_2 + U.V. \text{ Light} \rightarrow 2\ Cl.$$

thereby increasing the propagation rate of the reaction $$Cl \cdot + -CH_2-CH_2- \rightarrow -CH_2-CH-+HCl\ -CH_2-CH-+Cl_2 \rightarrow -CH_2-CHCl-+Cl\cdot$$

GAS RECYCLE

Due to the increased gas flow required in this process, utilization of the reactor exit gas in a recycle system is economically attractive. The recycle stream would include unreacted $Cl_2$ as well as anhydrous HCl produced in equal molar concentrations with the chlorinated polymer. It was determined that 100% substitution of anhydrous HCl for $N_2$ in the reactor feed gas effected neither reaction rate nor product properties.

Preferred chlorination procedures comprise utilization of temperatures of from about 20° C. to about 80° C. maximum up to a chlorine content of about 30 percent by weight (initial reaction), and chlorination temperatures of from about 60° C. up to about 100° C. maximum to a chlorine content of up to about 65 percent by weight (post reaction).

Generally the properties of HCHBDP lie between those of polyethylene (PE) and polyvinylchloride (PVC). PVC and HCHBDP properties differ because of chlorine distribution on the polymer chain. Infrared analysis has shown HCHBDP to be a product of random chlorine distribution of the block copolymer type while PVC has a uniform chlorine distribution because chlorine is positioned prior to polymerization.

HCHBDP has the advantage over both PE and PVC in that it has a very wide range of properties which can be controlled by the degree of chlorination.

CRYSTALLINITY

Figure 17:
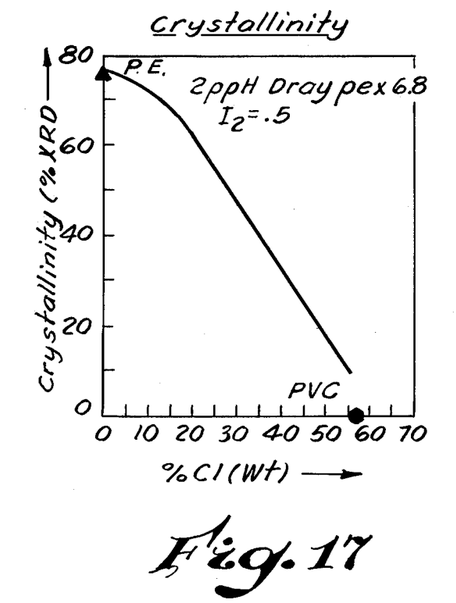

FIG. 17 shows the decrease in crystallinity of HCHBDP with increasing chloride concentration. The relatively small initial slope is due to chlorination of the amorphous portion of the PE. With the decrease in the concentration of these amorphous sites, a more regular pattern of crystalline destruction is established.

Figure 18:
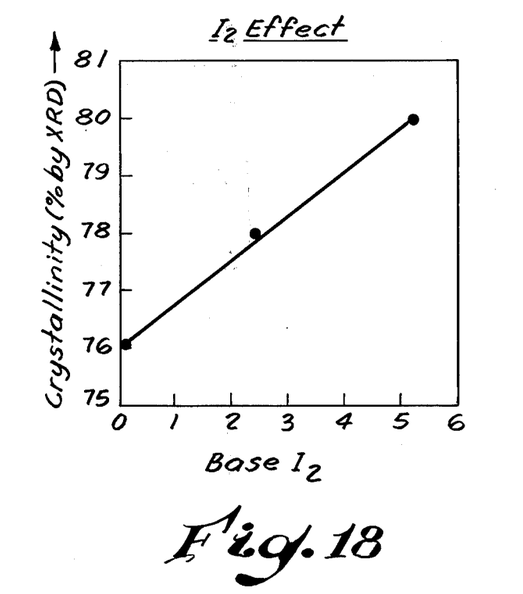

FIG. 18 shows the effect of PE increasing $I_2$ and crystallinity. The use of different $I_2$ polyethylene will shift the crystallinity versus Cl concentration curve.

TENSILE YIELD

Figure 19:
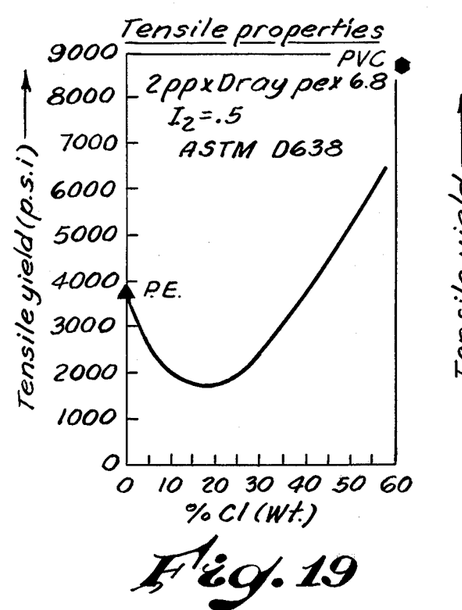

Tensile is a measure of polymer strength. HCHBDP has a tensile range of from 2,000 PSI to 6,500 opposed to narrow ranges of 4,000 for PE and 7,500 for PVC (FIG. 19).

Figure 20:
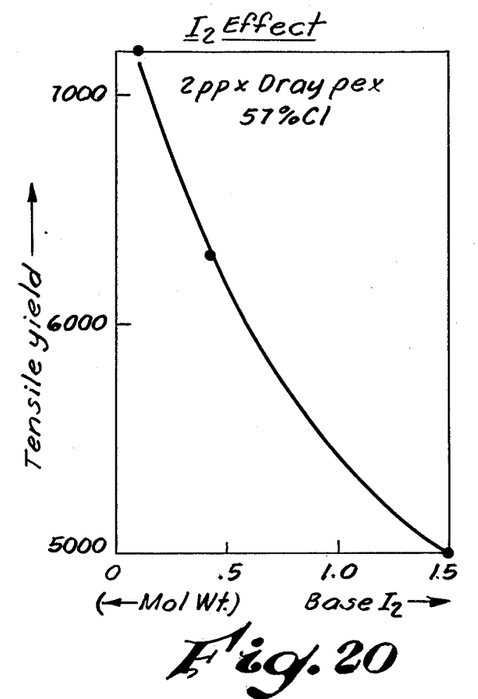

As base PE $I_2$ is increased, tensile decreases (FIG. 20). By using a higher molecular weight PE (lower $I_2$), tensiles can be increased to over 7,000 PSI.

HEAT DEFLECTION TEMPERATURE (HDT)

Figure 21:
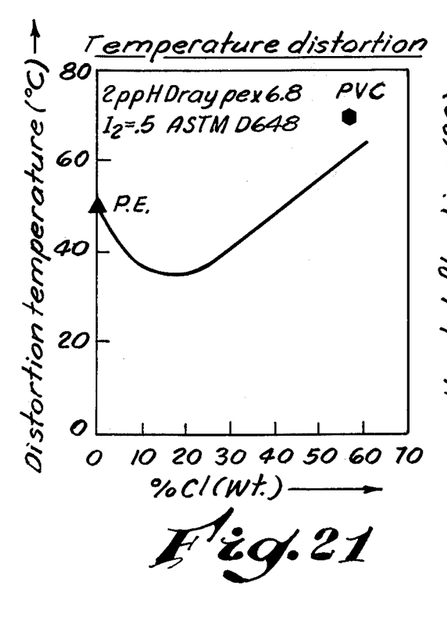

HDT is that temperature at which a polymer begins to loose its strength. FIG. 21 shows HCHBDP with HDT up to 68° C. or very close to valves of PVC.

Figure 22:
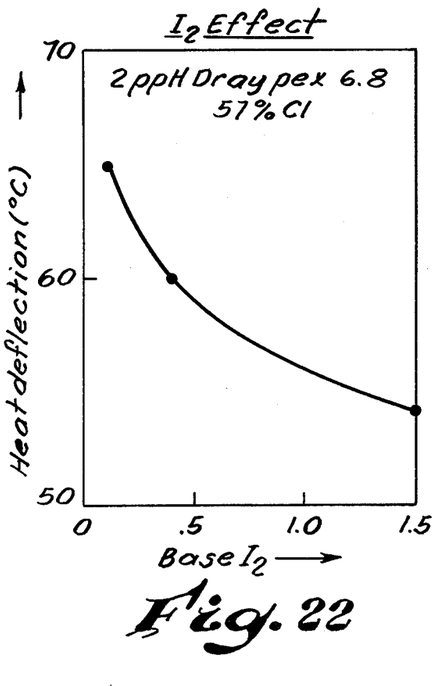

FIG. 22 shows an increase in HDT with decreasing $I_2$ (increased molecular weight).

FLEXURAL MODULUS

Figure 23:
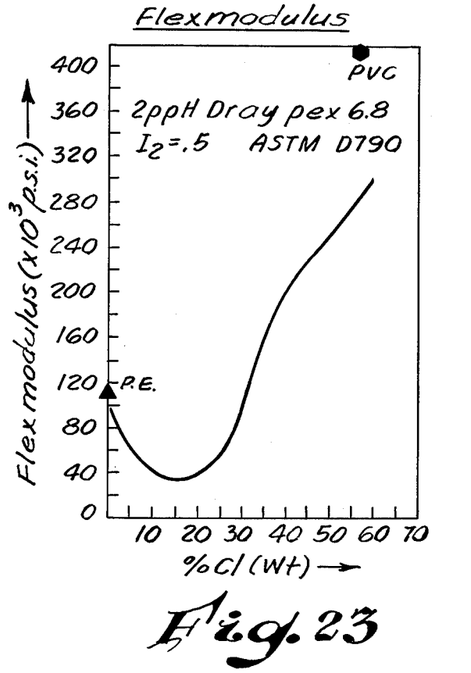

Flex modulus is the force required to bend a polymer and is a measure of its rigidity. FIG. 23 shows PVC to be the most rigid of the three with HCHBDP varying between more or less rigid than PE depending on the chlorine concentration.

HARDNESS

Figure 24:
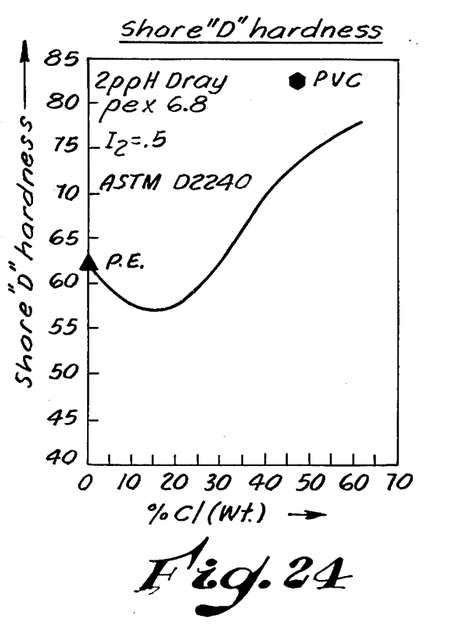

The hardness of HCHBDP is approximately the same as PVC at equal chlorine concentrations, both of which greatly exceed the value of PE (FIG. 24).

IZOD IMPACT

Figure 25:
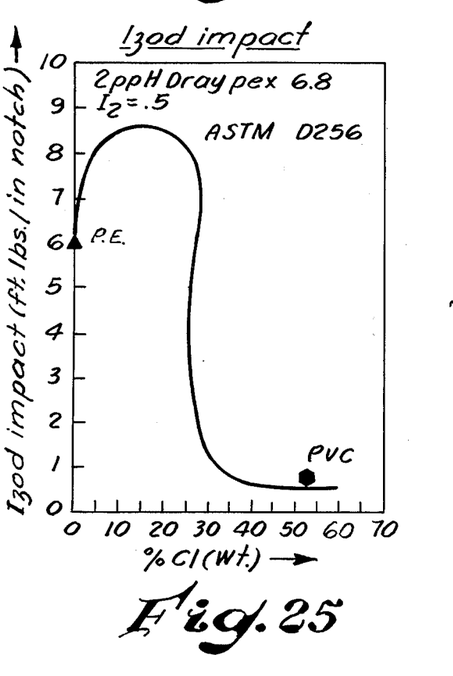

Izod impact is a measure of a polymer's ability to withstand a sharp blow. Polyethylene has a very good impact rating while that of PVC is very poor. HCHBDP varies between better than PE to about the same as PVC with increasing chloride concentration (FIG. 25).

VISCOSITY

Figure 26:
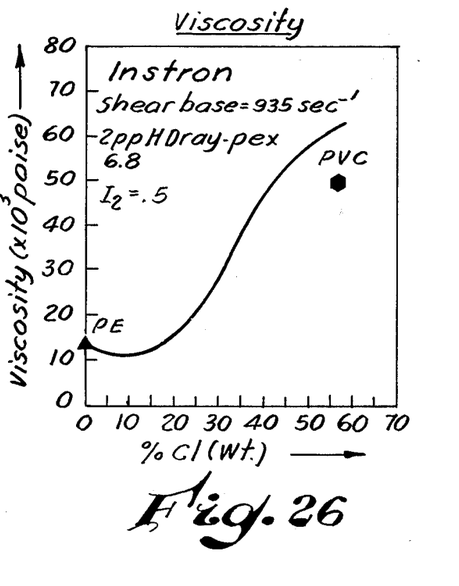
Figure 27:
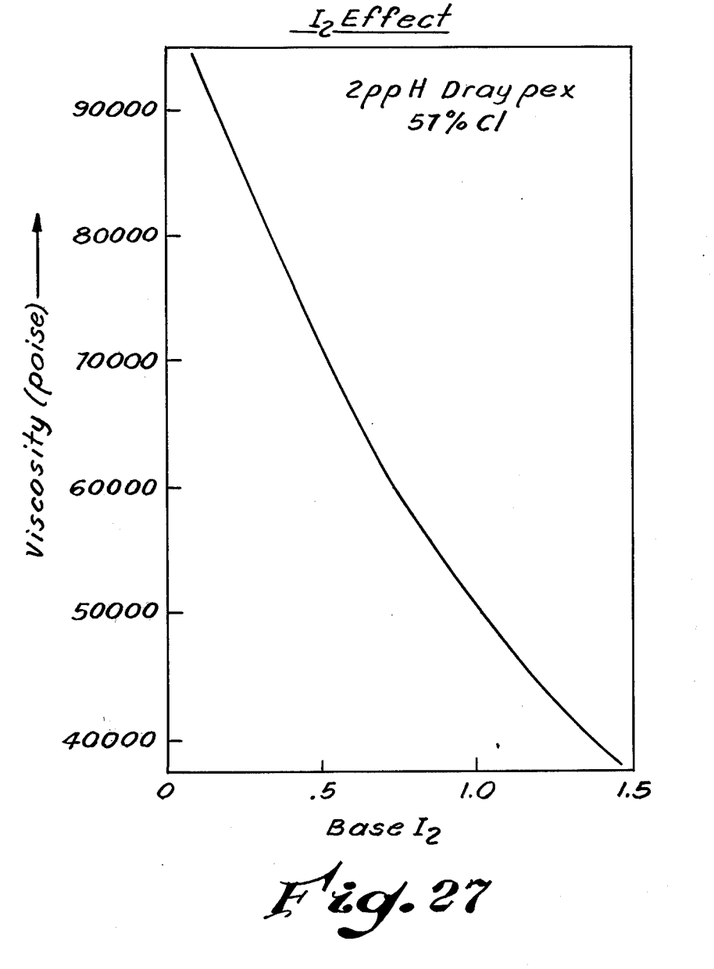

Viscosity is a measure of a polymer's processibility. HCHBDP has a higher viscosity than PVC at equal chloride concentrations (FIG. 26) but can be adjusted by the use of higher $I_2$ (lower molecular weight) PE base powder (FIG. 27).

All of the chlorinated high bulk density polyethylenes contemplated by the present invention decompose upon heating. In this regard, conventional stabilizers may be beneficially used. Exemplary of a particularly preferred stabilizer system is a dibutyl tin maleate with a hindered phenol antioxidant. Other useful systems include conventional barium-cadmium stabilizers, particularly when combined with CaO to impart improved long-term stability. Addition of a phosphite chelator is also helpful. Other useful stabilizers include the phosphite and phthalate salts as well as dibasic lead silicate and the mercaptides such as butyl tin mercaptide. Further, optimum stability to corrosion is achieved by purging the reactor with a suitable inert gas, e.g., $N_2$, to remove at least about 50 to 60 percent of residual acid from the chlorinated products.

Additionally, flexible chlorinated products may be achieved by incorporation of conventional plasticizers. Exemplary of such materials are the phosphates such as tricresyl phosphate, the chlorinated paraffins, the phthalates, e.g., dioctyl phthalate, epoxidized soybean oils and the adipates, e.g., dioctyladipate.

The highly chlorinated high bulk density polyethylenes as contemplated by the present invention including plasticized and filled materials are useful for a wide variety of applications requiring high strength.

More particularly, these materials may be advantageously used in those applications requiring the combination of properties provided by conventional polyvinyl chloride including the preparation of pipe and foam profile extrusion compounds and as jacketing material for wire and cable.

What is claimed is:

1. In the process of chlorinating solid, linear polyethylene with gaseous chlorine while holding said polyethylene in a fluidized bed state, the improvement consisting of: utilizing a polyethylene characterized by having a flowability measured as angle of repose of from about 24° to about 28°, a bulk density in the range of from about 25 to about 35 pounds/cubic foot and a surface area in the range of from about 2 to about 4 square meters/gram, said polyethylene being composed of individual particles having particle sizes predominantly in the range of from about 300 to about 600 microns and a porosity sufficient to provide an average free volume within individual particles in the range of from about 20 to about 45 volume percent based on total particle volume wherein said polyethylene is fluidized in the presence of an inert fluidizing gas to an extent sufficient to provide a value of no greater than 4 wherein said value is obtained by dividing the height of the powder bed in the reactor by the velocity in feet/second of said fluidizing gas and wherein said polyethylene is chlorinated to an extent of up to about 30 percent by weight chlorine by conducting the chlorination reaction at a temperature not exceeding about 80° C.

2. The process of claim 1 wherein said polymer is chlorinated to an extent of up to about 65 percent by weight chlorine comprising utilization of reaction temperatures not exceeding about 80° C. to provide a chlorine content of up to about 30 percent by weight and thereafter maintaining the reaction temperature from about 60° C. to about 100° C.

* * * * *